April 28, 1959 C. H. KANGAS 2,884,132
AUTOMATIC FILTER BACKWASH SYSTEM
Filed Sept. 9, 1955 5 Sheets-Sheet 1

INVENTOR.
C. H. KANGAS
BY
ATTORNEYS

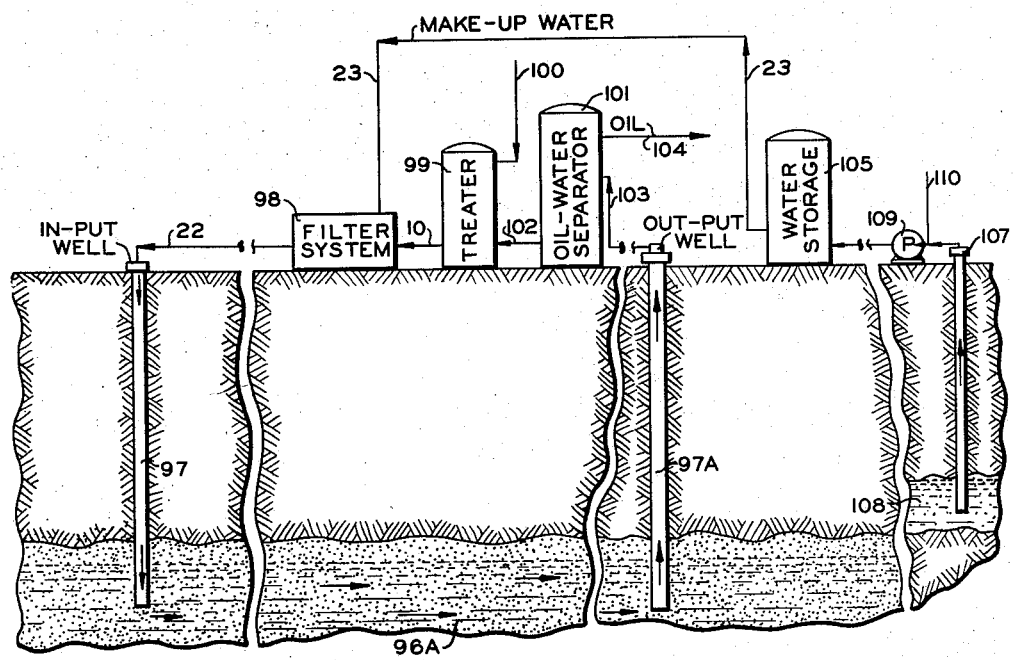
FIG. 2.
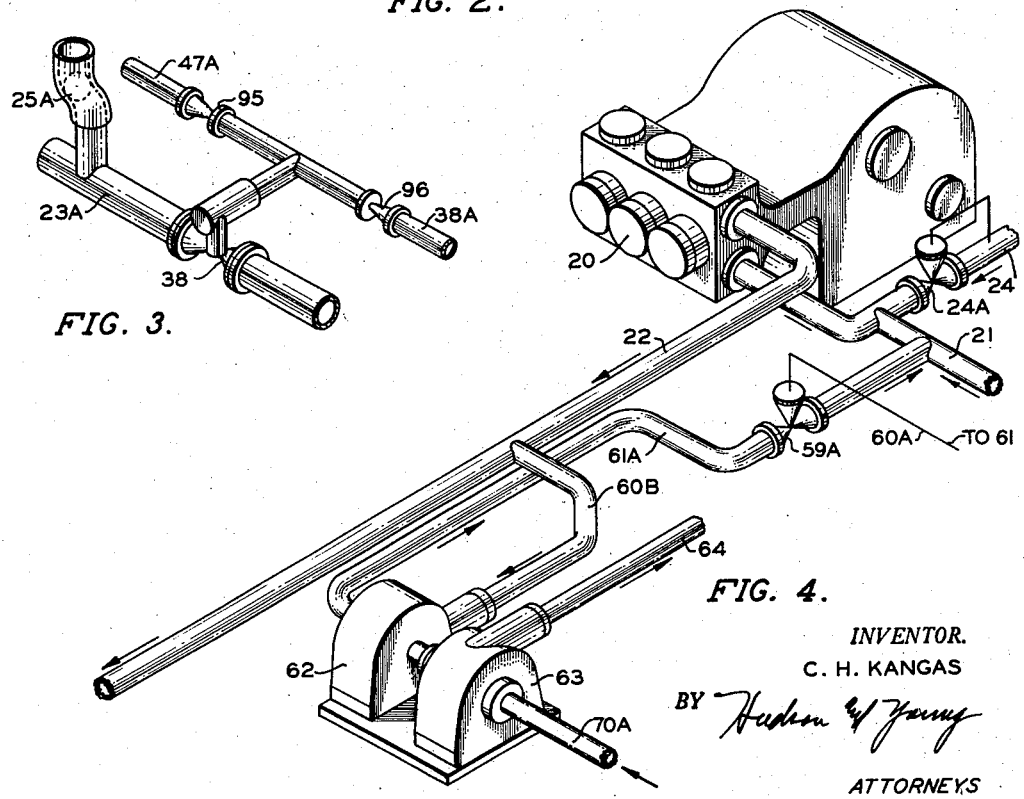
FIG. 3.
FIG. 4.
INVENTOR.
C. H. KANGAS
ATTORNEYS

April 28, 1959

C. H. KANGAS 2,884,132

AUTOMATIC FILTER BACKWASH SYSTEM

Filed Sept. 9, 1955

INVENTOR.
C. H. KANGAS
BY
ATTORNEYS

INVENTOR.
C. H. KANGAS

2,884,132
Patented Apr. 28, 1959

2,884,132

AUTOMATIC FILTER BACKWASH SYSTEM

Charles H. Kangas, Bartlesville, Okla., assignor to Phillips Petroleum Company, a corporation of Delaware Application September 9, 1955, Serial No. 533,461

9 Claims. (Cl. 210—123)

This invention relates to oil field water flood systems for production of oil. In one aspect, it relates to treatment of water for use in oil field water flood systems. In another aspect, it relates to the filtration of water for use in oil field water flood systems.

In the operation of oil field water flood systems, it is common practice to treat the water in the system to prevent, or at least, minimize corrosion and formation plugging. One phase of the water treatment is the filtration of the water for removal of solid matter prior to injection of the water into water flood input wells. To keep the efficiency of the filters high, they must be backwashed periodically. My invention relates particularly to automatic control of such a filtering system.

An object of my invention is to provide an automatically controlled filtering system for preparation of water for use in oil field water flood systems.

Another object of my invention is to provide such a filtering system which will require little or substantially no manual operation.

Still another object of my invention is to provide such a system which is fully automatic and which is relatively inexpensive to construct and to operate.

Still other objects and advantages of my invention will be realized upon reading the following description, which, taken with the attached drawing, forms a part of this specification.

In the drawing,

Figure 2 is a diagrammatic view, in elevation, of my filter system in conjunction with a water flood operation.

Figure 3 illustrates substitute apparatus for a portion of the apparatus of Figure 1.

Figure 4 illustrates in diagrammatic form, alternate apparatus of another portion of the apparatus of Figure 1.

Figure 1:
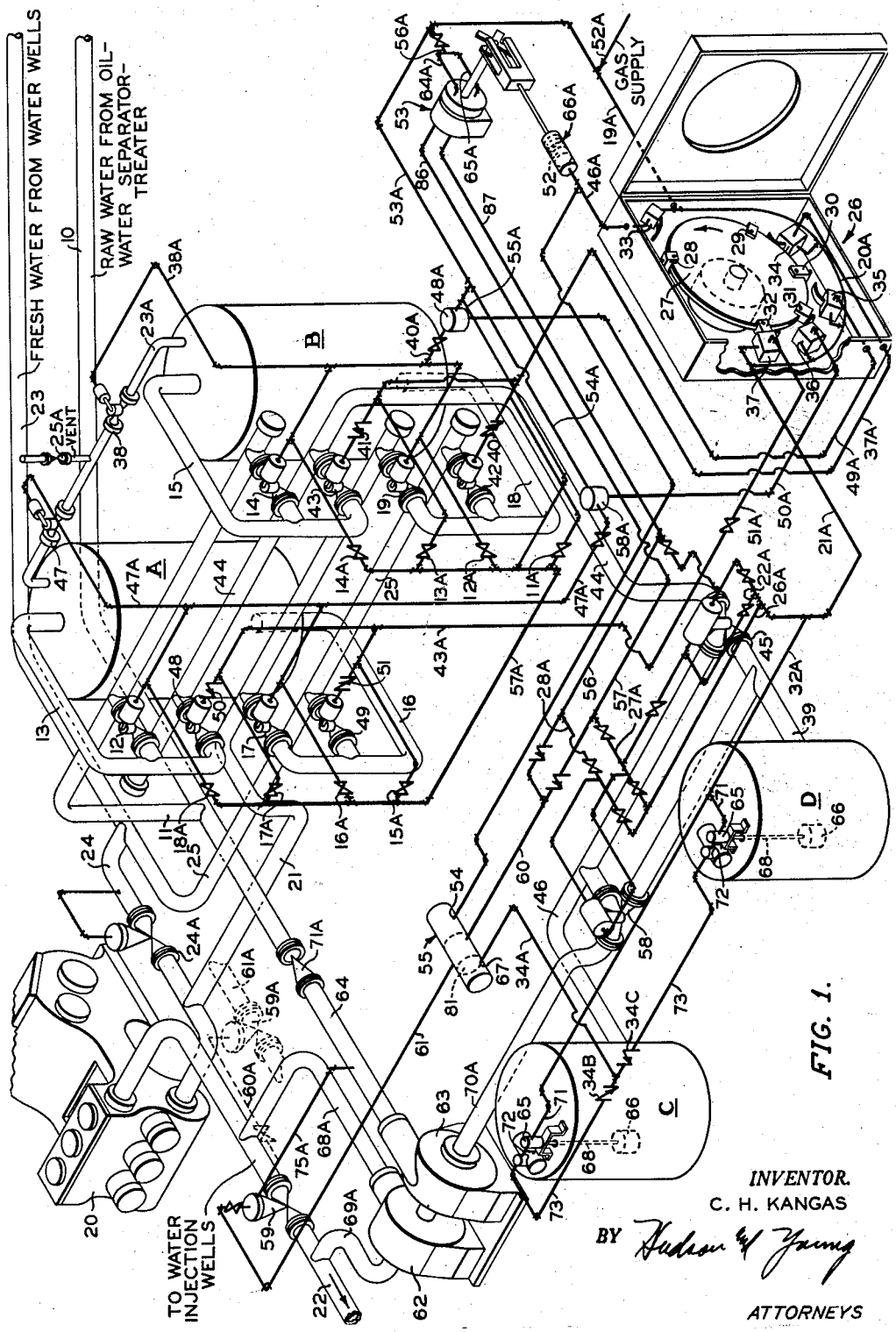
Figure 1 is a detailed view, in perspective, of an arrangement of apparatus parts for carrying out my invention.

Referring now to the drawing and specifically to Figure 1, raw water from an oil-water separator and treating unit, not shown, enters my filter system through a pipe 10. This water flows on through a branch pipe 11, a normally open motor valve 12 and pipe 13 into a filter tank A. Filter tank A is provided with any desired filtration medium, as for example, gravel and/or sand, or any other suitable filter medium. Filtered water emerges from filter tank A through a pipe 16 and flows through a normally open motor valve 17 into a pipe 21 from which it flows into the suction of a pump 20. This pump 20 discharges water under pressure through a pipe 22 for passage to water injection wells of the water flood system.

A second filter tank B is operated substantially in parallel with filter tank A and under such conditions, raw water to be filtered from pipe 11 passes through a normally open motor valve 14 and through a pipe 15 into the top of filter tank B. Filtered water emerges therefrom and flows through a pipe 18 and a normally open motor valve 19 into pipe 21, and thence to the suction of pump 20 along with the filtered water from filter tank A.

After such filter tanks have been in operation for appreciable lengths of time, pressure drop through the filter beds increases and filtration rates become slower and it is desirable to backwash the filter beds in order to remove the solid material plugging the beds. In order to backwash these filter tanks, I provide the herein disclosed apparatus for carrying out this operation automatically.

This system is a pneumatic system, as herein disclosed, but it is to be understood that a portion, or all of the controls, if desired, can be electrically operated. Merely as an example of the operation of such apparatus, I will describe the operation of pneumatically actuated and controlled instruments and equipment. A supply of pressure gas from a source, not shown, enters my system through a pipe 52A. This gas, for control and operation of my apparatus, can be any desirable gas, as for example, air, natural gas which is substantially free from easily condensable hydrocarbons, or residue gas from a gasoline extraction plant. That is, substantially any chemically inert gas under sufficient pressure can be used.

In order to backwash the filter bed of filter vessel B, for example, a gas, under pressure, such as a residue gas or air from line 52A passes through line 53A to a relay 48A. Since the length of time required for a suitable backwashing operation is relatively small and because I am devising a fully automatic apparatus, I employ a time sequence controller 26 for starting and stopping the various operations involved. The operating and control gas under pressure passes also from line 52A through a line 19A to the controller 26. This gas under pressure, also passes from line 19A through a tube 20A and through lines 21A and 32A to certain portions of the apparatus. The time sequence controller 26 is in this example, a clock operated apparatus having a wheel 27 which makes one complete revolution each 24 hours. Rigidly mounted on a non-revolving portion of controller 26 are a number of relays 33, 34, 35, 36 and 37. Attached to the revolving wheel 27 are cams 28, 29, 30, 31 and 32 which are intended to operate the respective relays. The cams and relays are so aligned that a given cam operates only one relay. When it is desired to backwash the filter tank B, cam 29 operates relay 34 and pressure gas from tube 20A flows through relay 34, and thence through line 37A to relay 48A. This pressure gas actuates relay 48A which allows pressure gas from line 53A to flow into line 40A to close the normally open motor valves 14 and 19. With valves 14 and 19 still closed cam 30 actuates relay 35 to allow pressure gas to flow through this latter relay from tube 20A into line 49A to open normally closed valves 42 and 43. With valve 42 open, fresh water for backwashing purposes and from a source, not shown, enters the system through a pipe 23 and flows on through pipe 25 and through valve 42 to line 18 into the lower portion of filter tank B. After flowing upward through the filter bed, this water which carries previously separated material in suspension leaves filter tank B through pipe 15 and it flows on through valve 43 into a pipe 44 and through a 3-way valve 45 and through pipe 46 into a settling tank C. When the cam 29 actuates relay 34 and allows pressure gas to flow through line 37A to valves 14 and 19, pressure gas also flows through line 38A to a valve 38, which is a normally open valve, to close this valve so that backwash water will not flow through vent pipe 23A and through vent valve 25A. When cams 29 and 30 are rotated far enough to release relays 34 and 35, respectively, valves 38, 14, 19, 42 and 43 return to their normal positions and filter tank B is again on the filtration portion of the cycle.

At a predetermined time, after filter tank B has been backwashed and again placed on filtration, filter tank A is backwashed in the same general manner. Cam 31 actuates relay 36 and pressure gas is thus transmitted through line 50A to a relay 58A, and pressure gas from branch line 54A passes through line 47A to close the normally open motor valves 12, 17 and 47. With valves 12, 17 and 47 still closed, the cam 32 actuates relay 37 to allow pressure gas to flow through line 51A and through line 43A to open the normally closed motor valves 48 and 49. Under these conditions, fresh water from pipe 23 flows through pipe 25 and valve 49 in pipe 16 into the bottom of filter tank A. This water flows upward through the filter bed therein and carries in suspension, previously separated solid material from the top of the vessel through pipe 13 and through valve 48 into a pipe 44. From pipe 44, this sediment, or solid material-carrying water flows through the 3-way valve 45 on through pipe 46 into the settling tank C. When cams 31 and 32 are rotated far enough to release relays 36 and 37, respectively, valves 47, 12, 17 (normally open) and valves 48 and 49 (normally closed) return to their normal positions and filter tank A is again on the filtration portion of its cycle. The normally open motor valve 47 is previously closed at the same time that the normally open motor valves 12 and 17 were closed when cam 31 actuated relay 36.

Check valves 40 and 41 which open in the direction indicated by the arrows, are each provided with a small opening (29B, Figure 8), which allows pressure to bleed through slowly when the valves are closed. Thus, valve 42 opens slowly and closes rapidly, while valve 43 opens rapidly but closes slowly. Relative to filter tank B, check valves 40 and 41 have these small openings to allow this slow opening of valve 42 and slow closing of valve 43 to protect filter tank B from high pressure available from pipe 25 to prevent filter bed channeling due to a surge of backwash water. Similarly, check valves 51 and 50 are provided with small openings which allow pressure to bleed through slowly when the valves are closed, and such pressure bleeding allows motor valve 49 to open slowly but close rapidly, and valve 48 to open rapidly and close slowly. This operation also is done to protect the filter bed in filter tank A from channeling due to surge of wash water into the bottom of the tank.

Usually, the amount of solid matter to be filtered from the water is not large, and the cycle periods in which the filter tanks are on stream are long relative to the backwash periods. For example, the backwash period under some conditions, requires a time interval of, for example, from 5 to 15 minutes, while the filtration portion of the cycle utilizes the remainder of a 24-hour period.

A pressure gas line 55A is connected with a manifold line 57A, which, in turn, is provided with manually operable valves 11A, 12A, 13A, 14A and manually operable valves 15A, 16A, 17A and 18A for use in case it is desired to operate filter tanks B and A manually. In normal automatic operation, however, these latter mentioned manually operable valves are closed.

Just prior to the actuation of relay 34 by cam 29, cam 28 actuates relay 33, pressure gas from line 19A is supplied through line 46A to a piston 52 in a piston assembly 66A and to a port 54 of a valve 55. Pressure gas is also supplied from line 53A through a branch line 56A to an alternating valve 53 by way of pipes 64A and 65A and thence to either line 86 or 87, depending upon the position of valve 53. Lines 86 and 87 are connected respectively with lines 57 and 56, which are connected with a line 60. Pressure gas from these several lines controls the 3-way valves 45 and 58, and valve 59 in pipe 22. The gas supplied to valve 55 through port 54 actuates valve 55 to open a port connecting line 60 with a line 61 to allow operation of the valve 59. Valve 59, when closed, diverts all of the water from pump 20 flowing through pipe 22 through a pipe 68A into a water turbine 62, thence through a discharge pipe 69A into pipe 22 downstream of valve 59. The water turbine 62 is directly connected to operate a water pump 63. Pipes 22A, 26A, 53A and 54A are for manual control.

Pump 63 removes clear water, after settling of sediment, from settling tank C or settling tank D via pipes 46 or 39, respectively, and pipe 70A, depending upon the positions of valves 45 and 58, and returns the water to the system through a pipe 64 containing a check valve 71A. A pressure connection 75A from pipe 64 to the normally open motor valve 59 controls valve 59 in proportion to the pressure in pipe 64 to throttle the flow of water through turbine 62 for controlling the speed of pump 63. When the settling tank C or D, from which water is being pumped reaches a predetermined low level, relay 65 is actuated to supply air by way of pipes 73 and 34A to port 67 of valve 55 to close port 82 (see Figure 6) between lines 60 and 61 to shut down pump 63 to cut off flow of water from the settling tanks.

Valved drain lines are provided in the bottoms of the settling tanks C and D in order to remove the settled sediment from time to time.

To summarize the operation of the system just described, filter tank B is backwashed and the backwash water with its load of sediment is run into, for example, settling tank C. After filter tank B is backwashed, it changes back to the filtration portion of the cycle. As soon as tank B is on filtration, filter tank A is backwashed and its backwash water and sediment also flow into settling tank C. After filter tank A is backwashed, it changes back to the filtration portion of the cycle. Just prior to the next backwash period, approximately 24 hours later, the 3-way valves 45 and 58 are switched to allow the next backwashing water to run into tank D and the pump 63 is started to empty tank C. Similarly, just prior to the next backwash period, valves 45 and 58 are switched to allow the backwash water to flow into tank C and the pump started to empty tank D. Thus, the water in each settling tank is allowed to settle for a period of 24 hours less the relatively short time required for the backwash cycle.

Figure 9:
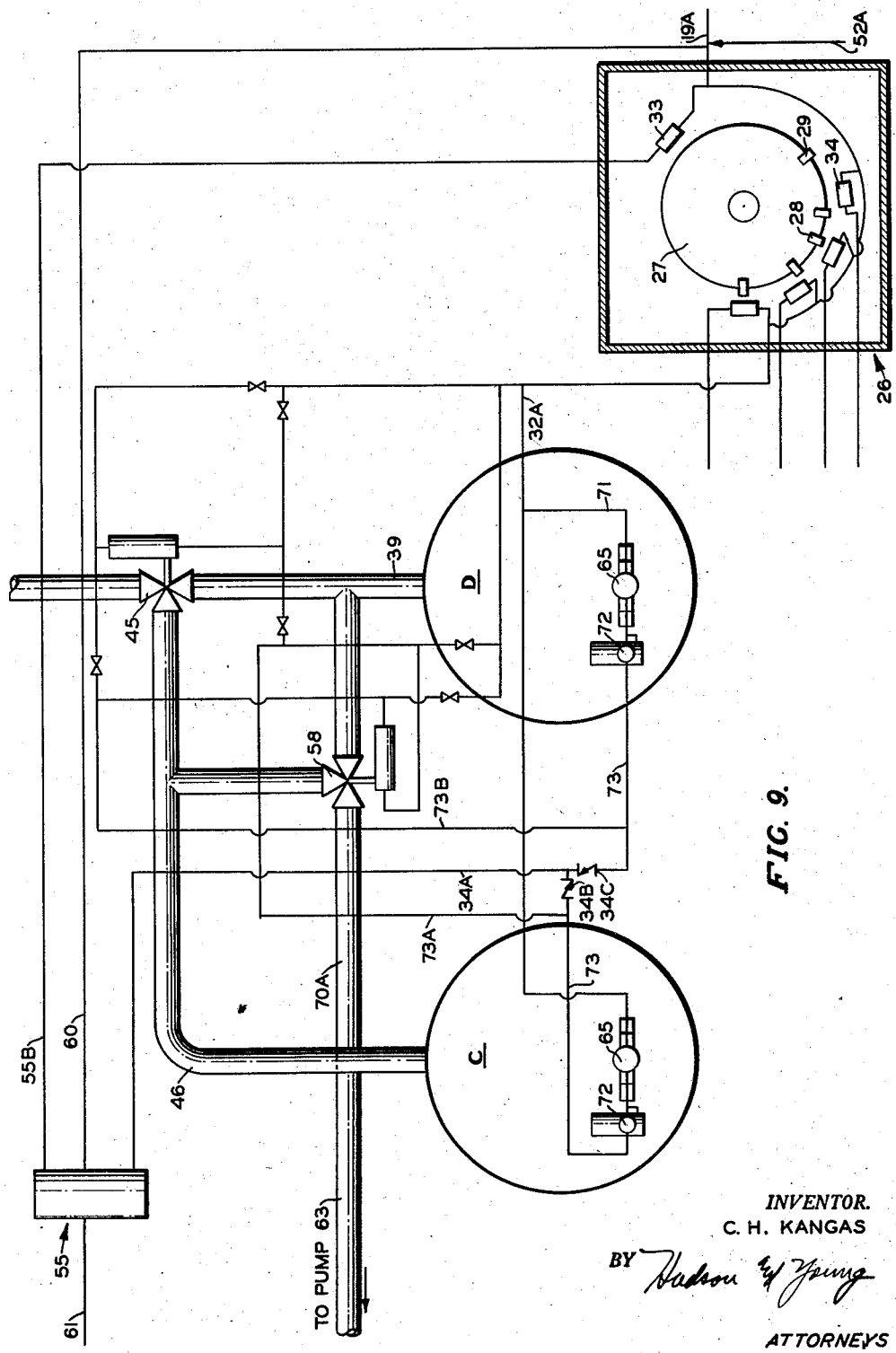
Figure 9 is a diagrammatic view of alternate apparatus for another portion of the apparatus of Figure 1.

Figure 9 illustrates the modification of the equipment which allows the backwash water to settle for a period of 48 hours less the time required to empty one of the settling tanks. All of the liquid lines and valves remain the same, only the controls for valves 45 and 58 being modified. The cam 28 for relay 33 is moved around the periphery of the wheel 27 to the position shown to actuate relay 33 an appreciable time before cam 29 actuates relay 34, this period of time being long enough to allow one of the filtration tanks to be emptied. Valve 53 and its associated actuating apparatus and control lines have been eliminated and relay 33 only actuates valve 55 via line 55B to align the ports connecting line 60 and 61 to start pump 63. Line 60 is connected directly to the gas supply 19A rather than to lines 56 and 57. Valves 45 and 58 are actuated by lines 73a and 73b connecting to line 73 on opposite sides of check valves 34B and 34C. Thus valves 45 and 58 are actuated by the pressure in line 73 each time one of the settling tanks is empty. When settling tank C empties, the valves are switched to allow the filtration tanks to be backwashed into tank C and tank D is connected to pump 63. This operation is reversed when tank D is emptied.

When cam 28 actuates relay 33, valve 55 is positioned to allow pressure to flow from line 60 to 61 thus starting pump 63 to empty one of the settling tanks. When this settling tank is emptied, valves 45 and 58 are actuated to allow the same tank to be filled again at the next backwash cycle which begins shortly thereafter as cam 29 actuates relay 34. This same settling tank will not be emptied until after the next following backwash cycle. Thus each tank is allowed to settle a period of time equal to 48 hours less the time required to empty it to complete the backwash cycle.

Figure 5:
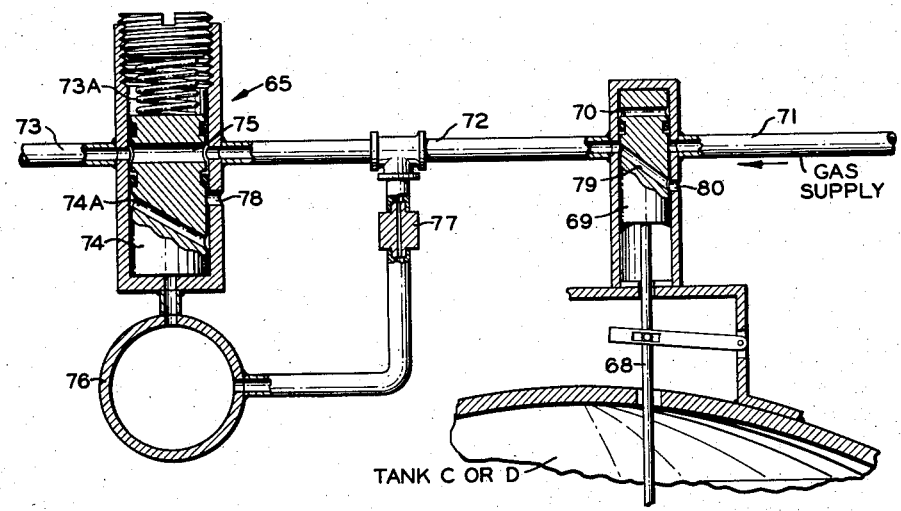
Figures 5, 6 and 7 are views, partly in section, of portions of the apparatus of Figure 1 on enlarged scales.

Figure 5 illustrates in diagrammatic form and on an enlarged scale, a float controlled relay 65. When the level in tank C or D falls below a float 66 attached to a float rod 68, a piston 69 is pulled downward, thus aligning a port 70 with a supply line 71 bringing pressure gas from lines 32A and 21A, and an intermediate supply line 72. A spring 73A at that time has positioned a piston 74 in a downward position (as shown), thus aligning port 75 with lines 72 and 73. Line 73 connects with line 34A which in turn connects with port 67 of valve 55. Only a momentary pulse is required to position piston 81 of valve 55, and this piston remains in its new position until another pressure pulse is applied to port 54, as described hereinbelow. Pressure from intermediate line 72 enters a chamber 76 through a choke 77, gradually building up pressure in chamber 76 until it overcomes the force of spring 73A, forcing piston 74 upward, thus connecting port 74A with line 73 and a vent port 78 to bleed the pressure from line 73. Under this condition, pump 63 is shut down and the tank is ready to be filled by operation of the backwash apparatus. When tank (C or D) is filled, piston 69 is raised to the position illustrated in Figure 5, thus connecting port 79 with intermediate line 72 and vent port 80 to reduce the pressure in volume chamber 76 to atmospheric, which pressure reduction allows piston 74 to move downward, and line 73 is then connected by way of port 75 intermediate line 72, ports 79 and 80 to the atmosphere.

Figure 6:
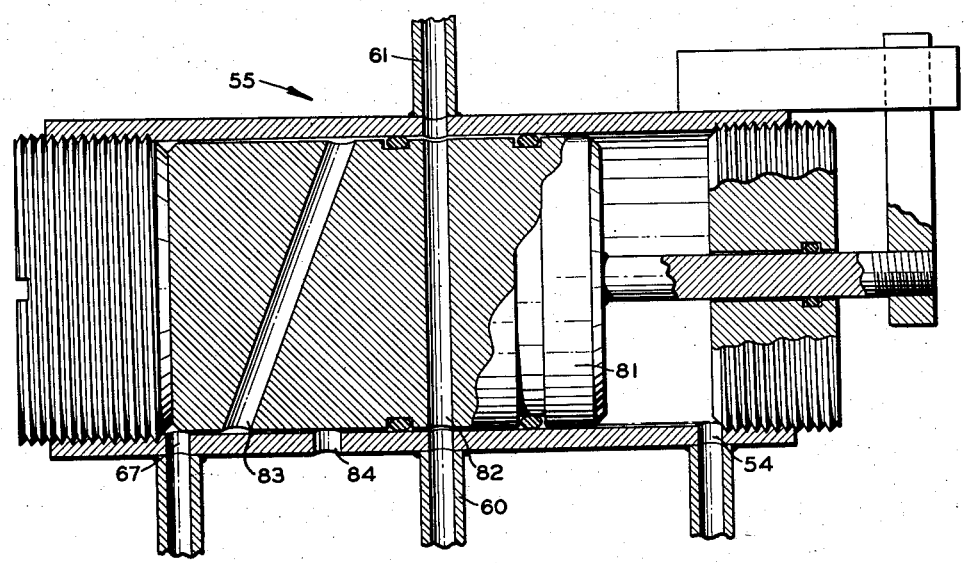

In Figure 6 is illustrated, in diagrammatic form and on an enlarged scale, the principles by which valve 55 is constructed and operated. When pressure gas is supplied to port 54, piston 81 is moved into the position illustrated, thus aligning port 82 with lines 60 and 61 to allow air from lines 86, 57 and 60 to be supplied through line 61 to valve 59. When pressure is removed from port 54 piston 81 remains in the position shown until pressure is supplied to port 67, at which time piston 81 is moved into a position which aligns port 83 with line 61 and vent port 84 to remove pressure from valve 59.

Figure 7:
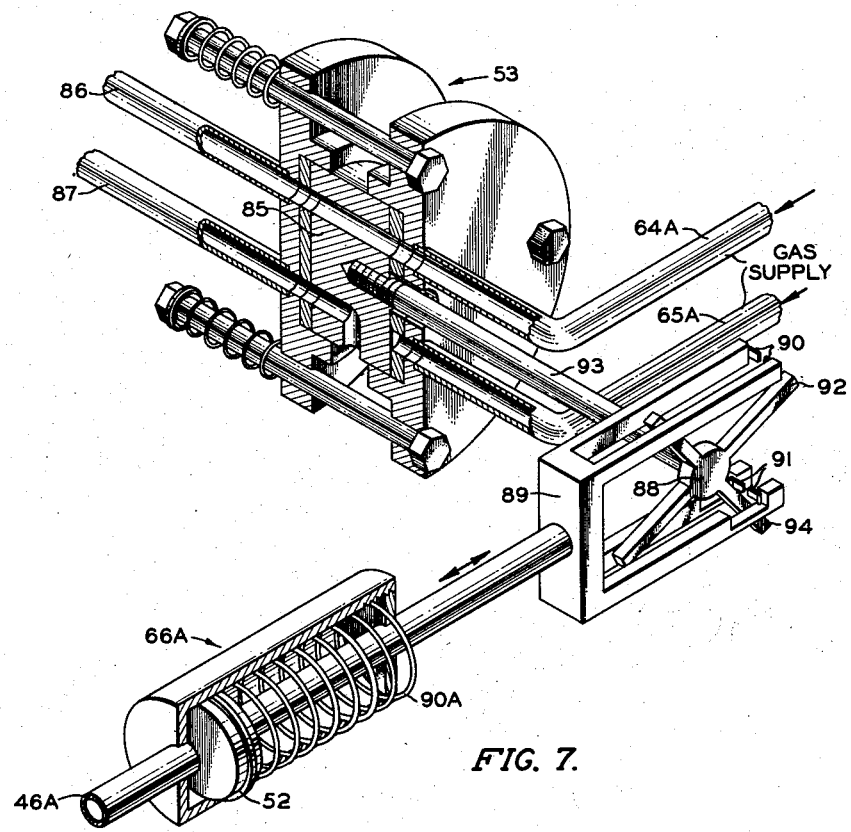

Figure 7 illustrates diagrammatically and on an enlarged scale, the construction and operation of the alternating valve 53. This valve includes a rotating piston 85, which, when rotated, alternately supplies gas to lines 86 and 87 and vents these lines to the atmosphere. Valve 53 is actuated by a piston 52 of a piston assembly 66A, also illustrated in Figure 7, and by a 4-arm wheel mechanism 88. When pressure is applied from line 46A to piston 52, a compression spring 90A is compressed and a yoke assembly 89 rotates a wheel 88, and when pressure is removed from piston 52, spring 90A returns piston 52 and yoke 89 to their starting positions. Yoke 89 is provided with spring-loaded dogs 90 which can push but cannot pull, and dogs 91 which can pull but cannot push. Thus, when yoke 89 is pushed in the direction to compress spring 90A, dogs 90 engage an arm 92 of wheel 88 to rotate (clockwise) shaft 93 connected to piston 85, while the return movement of yoke 89 permits dogs 91 to engage an arm 94 to complete the rotation of shaft 93 through a 180 degree angle for each complete cycle of movement of piston 52. In this manner, gas under pressure is supplied alternately on a 48 hour cycle to lines 86 and 87 and associated lines 57 and 56 respectively, to control the operation of valves 45 and 58 in sequence to connect one of the settling tanks C and D to the backwash system, and the other settling tank to pump 63.

Figure 8:
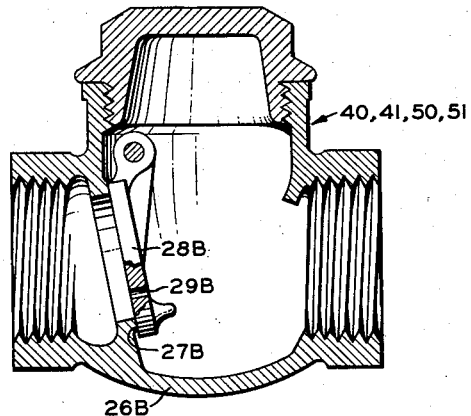
Figure 8 is a sectional view of another portion of my apparatus.

Figure 8 of the drawing illustrates, diagrammatically and on an enlarged scale, one form of a check valve I find suitable for use in the apparatus of Figure 1 as check valves 40, 41, 50 and 51. Such a valve comprises a housing 26B provided with a valve seat 27B upon which a flapper valve 28B rests when the valve is closed. Opening 29B is provided in flapper 28B as previously explained.

It should be realized that while I have described the operation of a filter system employing two filter tanks and two settling tanks, any desired number of filter tanks and settling tanks can be used embodying the principles of my invention by inserting additional cams and relays on wheel 27 of the sequence controller 26, or by installing additional wheels similar to wheel 27 and actuated by the same clock mechanism. It may be desired to use more than two settling tanks, in which case, valve 53 is arranged to turn less than 180 degrees per cycle of the yoke mechanism 89, and more than one relay 33 is then used.

In Figure 1 of the drawing, I have specifically mentioned manually operable valves 11A, 12A, 13A, 14A, 15A, 16A, 17A and 18A only. Other manually operable valves are disposed at proper points throughout the system in case an emergency should arise, and it is desirable to operate the system manually.

In Figure 3 is illustrated an alternate method of construction and of operation of vent line 23A. In this alternate method, vent line 23A is connected with filter tanks A and B as illustrated in Figure 1, and a single vent valve 25A is attached to line 23A, as shown. Only one valve 38 is required in place of valves identified in Figure 1 by 38 and 47. To operate valve 38, the pressure lines 38A and 47A are provided with check valves 96 and 95 respectively. In this manner, either tank A or tank B is vented to the atmosphere by exhaust of gas, but liquid cannot pass from one of these filter tanks to the other.

In Figure 4 is illustrated an alternate hookup for turbine 62 and water pump 63, wherein water turbine 62 is driven by high pressure water from pipe 22 through pipe 60B, the exhaust water being discharged through pipe 61A containing a valve 59A. Exhaust pipe 61A discharges exhaust water to pipe 21 and thence to the suction side of pump 20, the pressure drop being controlled by valve 59A. Valve 59A is a normally closed valve, being open only during such times as it is desired to pump water from settling tank C or D back to the filter tanks.

Figure 2 represents diagrammatically, installation of my filter system in a water flood oil recovery operation. In this figure, 97 and 97A represent a water input well and an oil-water output well, respectively. Oil and water from output well 97A pass through a pipe 103 to an oil-water separator 101, oil being removed through pipe 104 and water through pipe 102 to a treating tank 99. Treating chemicals, etc., are added via pipe 100. Treated water then flows through pipe 10 into the filter system identified in this figure by reference numeral 98, this filter system, of course, being that fully illustrated in Figure 1.

Makeup water and water for starting up such a waterflood operation originates in a water well or wells 107 from a water-bearing formation 108. This water is pumped by a pump 109 into a water-storage tank 105. Any treating agent required for treating this well water is added through a conduit 110. From storage tank 105, the water is passed through pipe 23 to the filter system illustrated in Figure 1. However, in case more makeup water is required than that normally used in the backwashing operation, it is passed through a pipe 24 directly to the suction of injection pump 20. Back pressure valve 24A regulates the in-flow of fresh water directly to the pump.

Briefly the complete cycle of the water in such a water flooding operation includes injection of filtered water into input well 97, the water flowing through the oil-bearing formation 96A with water and oil entering output well 97A. From this well, oil and water are produced and are passed into separator 101 with the water being removed through pipe 102 to the treater 99, and thence, through pipe 10 to the filter system to complete the cycle.

When the embodiment of Figure 4 is used, pressure line 60A is connected with valve 59A and with pipe 61 for transmitting pressure supply gas from line 61 to open this normally closed valve.

While certain embodiments of the invention have been described for illustrative purposes the invention obviously is not limited thereto.

What is claimed is:

1. A float controlled pneumatically operated relay comprising a first piston disposed operatively in a first cylinder, said first piston being adapted for attachment of a float, a second cylinder fitted operatively with a second piston, first and second ports in the side walls of said first cylinder, a first duct through said first piston, said first duct being adapted to alignment with said first and second ports at one end of the stroke of said first piston, third and fourth ports in the side walls of said second cylinder, a second duct through said second piston, said second duct being adapted to alignment with said third and fourth ports at one end of the stroke of said second piston, a first conduit communicating said second port with said third port, a pressure surge tank, said tank being in communication with one end of said second cylinder, a second conduit communicating said surge tank with said first conduit, a flow restricting element in said second conduit, a fifth port in the side wall of said first cylinder adjacent said first port, a sixth port in the side wall of said second cylinder adjacent said third port, a third duct through said first piston, said third duct being adapted to communicate said second port with said fifth port at the other end of the stroke of said first piston, a fourth duct through said second piston, said fourth duct being adapted to communicate said fourth port with said sixth port at the other end of the stroke of said second piston, a compression spring biasing said second piston to align said third and fourth ports with said second duct, said fourth duct in said second piston being intermediate said second duct and the point of communication of said second cylinder with said surge tank, said third duct being intermediate said first duct and the end of said first piston adapted for attaching to said float, said first port being adapted to communicate with a supply of fluid and said fourth port being adapted to communicate with a point of use of fluid from said supply.

2. In an oil recovery water flood system having a water injection well and an oil-water output well, the improvement comprising, in combination, with said wells, a filter tank provided operably with filter bed material, a first conduit, communicating said oil-water output well with the portion of said tank above said filter bed material, a first motor valve in said first conduit, a second conduit communicating the portion of said filter tank below said filter bed material with said water injection well and containing a second motor valve, third and fourth conduits communicating with said first and second motor valves respectively for passage of motive power thereto, a settling tank, a float actuated relay including a first piston disposed operatively in a first cylinder, said first piston being attached to a float disposed in said settling tank, a second cylinder fitted operatively with a second piston, first and second ports in the sidewall of said first cylinder, a first duct through said first piston, said first duct being adapted to alignment with said first and second ports at one end of the stroke of said first piston, third and fourth ports in the sidewall of said second cylinder, a second duct through said second piston, said second duct being adapted to alignment with said third and fourth ports at one end of the stroke of said second piston, a fifth conduit communicating said second port with said third port, a pressure surge tank, said surge tank being in communication with one end of said second cylinder, a sixth conduit communicating said surge tank with said fifth conduit, a flow restricting element in said sixth conduit, a fifth port in the sidewall of said first cylinder adjacent said first port, a sixth port in the sidewall of said second cylinder adjacent said third port, a third duct through said first piston, said third duct being adapted to communicate said second port with said fifth port at the other end of the stroke of said first piston, a fourth duct through said second piston, said fourth duct being adapted to communicate said fourth port with said sixth port at the other end of the stroke of said second piston, means biasing said second piston to align said third and fourth ports with said second duct, said fourth duct in said second piston being intermediate said second duct and the point of communication of said second cylinder with said surge tank, said third duct being intermediate said first duct and the end of said first piston attached to said float, said first port communicating with a supply of pressure fluid, said fourth port communicating with a point of use of said fluid from said supply; seventh and eighth conduits communicating with the portions of said filter tank above and below respectively, said filter bed material, third and fourth motor valves in said seventh and eighth conduits respectively, a first pressure pump in said second conduit intermediate said second motor valve and said injection well, a ninth conduit communicating said settling tank with said first conduit, a second pump and a fifth motor valve in said ninth conduit for regulating liquid flow from said settling tank to said first conduit, a sixth motor valve in said second conduit intermediate said first pump and said water injection well, a time sequence controller, a source of motive power for operating said valves, an alternating valve, tenth eleventh, twelfth and thirteenth conduits communicating said time sequence controller with said third, fourth and fifth motor valves and said alternating valve, respectively, said time sequence controller being adapted to regulate actuation of said alternating valve to transmit said motive power to close said sixth motor valve and to open simultaneously said fifth motor valve, a bypass conduit provided with a water powered motor bypassing said sixth motor valve in said second conduit, said water powered motor being connected operatively with said second pump, and said time sequence controller regulating flow of said motive power to said valves to open said first and second valves with said third and fourth valves being closed, to open said third and fourth valves with said first and second valves being closed, and to open simultaneously said fifth valve to said ninth conduit and to close said sixth valve in said second conduit at such time as said first and second valves are open, and further that said sixth valve is opened and said fifth valve is closed in response to a predetermined low level of water in said settling tank as sensed by said float.

3. A water filter in an oil recovery water flood system having a water injection well and an oil-water output well, the improvement comprising, in combination with said wells, a filter tank, a filter bed material disposed operatively in said tank, a first conduit in communication with the portion of said tank above said filter bed material for inlet of water to be filtered, said first conduit also communicating with said output well, a second conduit in communication with the portion of said tank below said filter bed material for outlet of filtered water, said second conduit being also in communication with said input well, first and second motor valves in said first and second conduits respectively, third and fourth conduits in communication with said first and second motor valves respectively for passage of motive power thereto, a first pressure pump in said second conduit intermediate said second motor valve and said injection well, fifth and sixth conduits in communication respectively with the portions of said tank above said filter bed material for outlet of washings and below said filter bed material for inlet of wash water, third and fourth motor valves in said fifth and sixth conduits respectively, seventh and eighth conduits in communication with said third and fourth motor valves, respectively, for passage of motive power thereto, a settling tank, said fifth conduit also being in communication with said settling tank for passage of washings thereto, said sixth conduit being in communication with a source of wash water, a source of motive power for actuating said motor valves, a ninth conduit communicating said settling tank with the portion of said filter tank above said filter bed for passage of water from said settling tank to said filter tank, a pump in said ninth conduit for transmitting said water to said filter tank, a time sequence controller in communication with said source of motive power and with said third, fourth, seventh and eighth conduits for regulating flow of said motive power to said valves to open said first and second valves with said third and fourth valves being closed and to open said third and fourth valves with said first and second valves being closed.

4. A water filter system for filtering water in a water flood secondary oil recovery system comprising in combination, a water input well, an oil and water output well, a filter tank, a filter bed material disposed operatively in said tank, a first conduit in communication with the portion of said tank above said filter material and with said output well for passage of water to be filtered to said filter tank, a second conduit in communication with the portion of said tank below said filter bed material for outlet of filtered water, said second conduit also being in communication with said input well for passage of filtered water thereto, first and second fluid pressure operative motor valves in said first and second conduits respectively, third and fourth conduits for providing fluid pressure motive power to said first and second valves respectively, fifth and sixth conduits in communication respectively with the portion of said tank above said filter bed for outlet of washings and below said filter bed for inlet of wash water, fluid pressure operative third and fourth motor valves in said fifth and sixth conduits respectively, seventh and eighth conduits for supplying fluid pressure motive power respectively to said third and fourth motor valves, a settling tank, said fifth conduit also being in communication with said settling tank, a source of fluid pressure motive power, a time sequence controller in communication with said source of motive power and with said third, fourth, seventh and eighth conduits for regulating flow of said fluid pressure motive power to said valves to open said first and second valves with said third and fourth valves being closed and to open said third and fourth valves with said first and second valves being closed.

5. In an oil recovery water flood system having a water injection well and an oil-water output well, the improvement comprising, in combination with said wells, a filter tank, a filter bed material disposed operatively in said tank, a first conduit in communication with the portion of said tank above said filter bed material for inlet of water to be filtered, said first conduit also communicating with said output well, a second conduit in communication with the portion of said tank below said filter bed material for outlet of filtered water, said second conduit being also in communication with said input well, first and second motor valves in said first and second conduits respectively, third and fourth conduits in communication with said first and second motor valves respectively for passage of motive power thereto, a first pressure pump in said second conduit intermediate said second motor valve and said injection well, fifth and sixth conduits in communication respectively with the portions of said tank above said filter bed material for outlet of washings and below said filter bed material for inlet of wash water, third and fourth motor valves in said fifth and sixth conduits respectively, seventh and eighth conduits in communication with said third and fourth motor valves, respectively, for passage of motive power thereto, a settling tank, a float actuated relay in said settling tank, a float in said settling tank for actuating said relay, said relay being adapted to operate in response to the level of liquid in said settling tank as sensed by said float, said fifth conduit also being in communication with said settling tank for passage of washings thereto, said sixth conduit being in communication with a source of wash water, a ninth conduit communicating said settling tank with said first conduit for passage of clear water to said first conduit, a fifth motor valve in said ninth conduit, a second pump in said ninth conduit intermediate said fifth motor valve and said first conduit, a sixth motor valve in said second conduit intermediate said first pressure pump and said injection well, tenth and eleventh conduits in communication with said fifth and sixth motor valves respectively for passage of motive power thereto, a source of motive power, an alternating valve, said eleventh conduit also communicating with said alternating valve, a time sequence controller, said time sequence controller communicating with said source of motive power, with said alternating valve and with said third, fourth, seventh, eighth and tenth conduits, and said time sequence controller being adapted to regulate actuation of said alternating valve to transmit motive power to said sixth valve and to regulate transmission of said motive power to said fifth valve in such a manner that as said sixth valve closes said fifth valve opens, a by-pass conduit provided with a water powered motor by-passing said sixth valve in said second conduit, said water powered motor being operatively connected with said second pump, said time sequence controller being adapted to regulate motive power to open said first and second valves with said third and fourth valves being closed, to open said third and fourth valves with said first and second valves being closed, and to close said sixth valve in said second conduit at such a time as first and second valves are open and said third and fourth valves are closed, and further that said sixth valve is opened and said fifth valve is closed in response to a predetermined low level of water in said settling tank as sensed by said float.

6. In a water filter system for filtering water in a water flood secondary oil recovery system, the improvement comprising, in combination, a filter tank provided with a bed of filter material, a settling tank in which to settle sediment from sediment containing backwash water, first and second conduits communicating the portion of said filter tank above said filter material with said settling tank for passage of backwash water and sediment to said settling tank and for transfer of settled water to said filter tank respectively, a pump in said second conduit for effecting said transfer of settled water, a liquid level float actuated control for closing down said pump in response to a predetermined low liquid level of water in said settling tank as sensed by the float of said control and a time cycle control for starting said pump.

7. In a water filter system for filtering water in a water flood secondary oil recovery system having a filter tank provided with a filter bed, a plurality of conduits for passage of water to be filtered from on oil-water output well to the filter tank and for passage of filtered water from the filter tank to a water input well, a plurality of motor valves for regulating water flow in said plurality of conduits, the improvement comprising, in combination, a settling tank for settling sediment from sediment containing backwash water, a valve switching means for closing off flow of water to be filtered, for closing off flow of filtered water, for opening flow of backwash water to said filter tank and for opening flow of backwash water and sediment from said filter tank, first and second conduits communicating the portion of said filter tank above said filter material with said settling tank, a pump in the second conduit for transferring water from said settling tank to said filter tank, a liquid level float actuated control for closing down said pump in response to a predetermined low liquid level of water in said settling tank as sensed by the float of said float actuated control and a time cycle control means for starting said pump.

8. A continuously operable water filter system comprising first and second filter tanks provided with beds of filter material, means for passage of water to be filtered to said filter tanks, means for outlet of filtered water from said filter tanks, means for admitting backwash water to the lower portions of said filter tanks, a settling tank for settling sediment from sediment containing backwash water, first and second conduits for alternate passage of backwash water and sediment from the upper portions of said filter tanks to said settling tank, a third conduit provided with a transfer pump communicating said settling tank with said means for passage of water to be filtered, a liquid level float actuated control for closing down said pump in response to a predetermined low liquid level of water in said settling tank as sensed by the float of said control, a time cycle control for starting said pump, for admitting backwash water alternately to said filter tanks, for alternately opening and closing off said first and second conduits to flow of backwash water and sediment and for actuating said means for passage of water to be filtered continuously to at least one filter tank.

9. A continuously operable water filter system comprising first and second filter tanks, each tank being provided with a bed of filter material, first conduits communicating the upper portions of the filter tanks for inlet of water to be filtered, second conduits communicating the lower portions of the filter tanks for outlet of filtered water, a settling tank, a third conduit for passage of backwash water and sediment from the upper portions of said filter tanks to said settling tank, a fourth conduit provided with a transfer pump communicating said settling tank with the upper portions of said filter tanks for passage of settled water to said filter tanks, motor valves in said conduits for regulating flow of water, a time cycle controller for actuating of said motor valves, said controller being adapted to direct upflow of backwash water in said first filter tank and to direct flow of said backwash water and sediment from said first filter tank in said third conduit to said settling tank simultaneously with directing downflow of water to be filtered through said second filter tank, said controller being adapted to close off backwash water flow to said first filter tank and to open backwash water flow to said second filter tank simultaneously with closing off flow of water to be filtered to said second filter tank, said controller also being adapted to close off backwash water flow to said second filter tank and to open flow of water to be filtered to said second filter tank whereby said water to be filtered is continuously passed through at least one filter tank, and to energize said transfer pump in said fourth conduit for transfer of settled water to said filter tanks.

References Cited in the file of this patent

UNITED STATES PATENTS

| | | |
|---|---|---|
| 1,310,615 | Greenlee | July 22, 1919 |
| 1,795,288 | Browne | Mar. 10, 1931 |
| 1,899,063 | Stoll | Feb. 28, 1933 |
| 1,984,302 | DeVries | Dec. 11, 1934 |
| 2,055,764 | Hanson | Sept. 29, 1936 |
| 2,076,322 | Pick | Apr. 6, 1937 |
| 2,161,721 | Negus | June 6, 1939 |
| 2,217,692 | McGill | Oct. 15, 1940 |
| 2,348,161 | Van Duzee | May 2, 1944 |
| 2,407,180 | Schiller | Sept. 3, 1946 |
| 2,413,138 | Feinberg | Dec. 24, 1946 |
| 2,570,131 | Koupal | Oct. 2, 1951 |